United States Patent
Ananthapadmanabh et al.

(10) Patent No.: US 9,864,648 B2
(45) Date of Patent: *Jan. 9, 2018

(54) RESOURCE MANAGER FAILURE HANDLING IN A MULTI-PROCESS TRANSACTION ENVIRONMENT

(71) Applicant: International Business Machines Corporation, Armonk, NY (US)

(72) Inventors: Madhu B. Ananthapadmanabh, Bangalore (IN); Gopalakrishnan P, Bangalore (IN); Tomohiro Taguchi, Chiba (JP); Hariharan N. Venkitachalam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/696,735

(22) Filed: Apr. 27, 2015

(65) Prior Publication Data

US 2016/0092318 A1    Mar. 31, 2016

Related U.S. Application Data

(63) Continuation of application No. 14/501,216, filed on Sep. 30, 2014.

(51) Int. Cl.
*G06F 11/07* (2006.01)
*G06F 11/14* (2006.01)

(52) U.S. Cl.
CPC ...... *G06F 11/0784* (2013.01); *G06F 11/0709* (2013.01); *G06F 11/1474* (2013.01); *G06F 2201/805* (2013.01); *G06F 2201/85* (2013.01)

(58) Field of Classification Search
CPC .................. G06F 11/1474; G06F 11/0709
See application file for complete search history.

(56) References Cited

U.S. PATENT DOCUMENTS 6,728,958 B1    4/2004    Klein et al.
6,823,356 B1 *  11/2004   Novaes ............... G06F 9/466
                                              707/999.008

(Continued)

FOREIGN PATENT DOCUMENTS

EP    1417558 B1    3/2012

OTHER PUBLICATIONS

IBM Appendix P, list of IBM patents or patent applications treated as related, 2 pages.

(Continued)

*Primary Examiner* — Yolanda L Wilson
(74) *Attorney, Agent, or Firm* — Daniel R. Simek

(57) ABSTRACT

A processor receives a request to perform a transaction, wherein each activity of the transaction is respectively associated with an application server process. The processor creates an entry in a mapping file, which includes at least information regarding the transaction, one or more resource managers to perform activities of the transaction, and the resources managed by the one or more resource managers. In response to detection of a failure of a resource manager of the one or more resource managers, the processor receives a notification from a call-back function of an XA specification switch of the resource manager associated with the failure. The processor identifies an application server process associated with the failure of the resource manager, and sends an event to terminate the application server process associated with the failure of the resource manager.

7 Claims, 5 Drawing Sheets

(56) References Cited

U.S. PATENT DOCUMENTS

| | | |
|---|---|---|
| 8,166,481 B2 | 4/2012 | Dadiomov et al. |
| 8,650,272 B2 | 2/2014 | Myers |
| 8,935,570 B2 * | 1/2015 | Childers, Jr. ....... G06F 11/1474 714/19 |
| 2004/0083225 A1 | 4/2004 | Gondi et al. |
| 2006/0248213 A1* | 11/2006 | Sherer ............... H04L 29/06027 709/231 |
| 2008/0250272 A1 | 10/2008 | Barnes et al. |
| 2010/0017642 A1* | 1/2010 | Myers ................. G06F 11/0709 714/2 |
| 2011/0055628 A1 | 3/2011 | Dennis et al. |
| 2011/0078516 A1 | 3/2011 | El-Kersh et al. |
| 2013/0246845 A1 | 9/2013 | Parkinson |

OTHER PUBLICATIONS

Sood et al., "Ensure higher availability by making your XA transaction manager resilient to resource manager failures", IBM, Jul. 22, 2009, pp. 1-8, <http://www.ibm.com/developerworks/websphere/techjournal/0907_sood/0907_sood.html>.

"Resource Manager's Role in Transactions" Microsoft Developer Network, © 2014 Microsoft, 1 page, <http://msdn.microsoft.com/en-us/library/ms687072(v=vs.85).aspx>.

"Resource Manager Failure Handling in a Multi-Process Transaction Environment", U.S. Appl. No. 14/501,216, pp. 1-36, filed Sep. 30, 2014.

* cited by examiner

RESOURCE MANAGER FAILURE HANDLING IN A MULTI-PROCESS TRANSACTION ENVIRONMENT

BACKGROUND OF THE INVENTION

The present invention relates generally to the field of software error handling, and more particularly to resource manager failure handling in a distributed transaction multi-process environment.

In computing, the extended architecture (XA) standard is a specification by The Open Group for distributed transaction processing (DTP). It describes the interface between the global transaction manager and the local resource manager. The XA specification is a standard for multi-process global transactions performed across multiple resource managers. The XA standard specifies the XA interface, or switch, which is the bidirectional interface between a transaction manager (TM) and a resource manager (RM). The TM manages the connection and the transaction coordination to all the resource managers. However, all the work performed on the resources is done by the application program, for example, database updates, such as SELECT and INSERT. The XA interface is not an ordinary application programming interface (API). It is a system-level interface between DTP software components.

The goal of the XA standard is to allow multiple resources (such as databases, application servers, message queues, transactional caches, etc.) to be accessed within the same transaction, thereby preserving the atomic, consistent, isolated, and durable (ACID) properties across applications. Atomic refers to a property in which work units must succeed or fail in an all-or-nothing manner, preventing partial updates to databases. Consistency refers to maintaining application constraints and that future transactions see the effects of past transactions. Isolated refers to how transaction integrity is visible to concurrent multiple users and systems. Durability is a property of transactions that insures a committed transaction remains as such, and in distributed transactions involves the coordination of participating systems.

The XA standard makes use of a two-phase commit to ensure consistency that all resources either commit to complete or rollback any particular transaction, as a type of consensus protocol. The XA standard specifies how a transaction manager will roll up the activities, or activities, of a transaction against the different data-stores into an "atomic" transaction and execute this with the two-phase commit protocol for the transaction. Thus, the XA standard is a type of transaction coordination, often among databases or other resources. The XA standard coordination allows many resources to participate in a single, coordinated, atomic operational step of a transaction.

The XA standard specification describes what an RM must do to support transactional access, such as each RM providing a switch that gives the TM access to the RM's call routines. The switch contains the RM's name, pointers to entry points, registration flag and other information used by a transaction manager in connecting with RMs. Providing the information allows the set of RMs linked with an application to be changed without having to recompile the application.

In a DTP environment, the transaction manager manages the connection and the transaction coordination to all the resource managers. However, all the work performed on the resources is done by the application running on the resource, for example, database updates, such as SELECT, and INSERT.

The TM adopts a multi-process model to run applications concurrently, and in such an environment, middleware may cache connection handles acquired through XA open requests (an XA initialization process) that may be invalidated during RM failures. In case of an RM failure, the process detects the failure of a subsequent RM specific XA request issued by the TM. It means the timing of failure detection and refreshing connection handle after recovering the failure differs in each process. In this environment, the application program (AP) has to handle all the resource specific errors gracefully, which requires an application programmer to consider how to handle the errors related to resources managed by RMs (such as communication failures, planned or unplanned shutdowns,) as well as other logical resource errors. The reason why the application must handle errors is because the communication happens directly between the application and the resource and there is no control for the middleware processes to intercept and handle the errors.

SUMMARY

According to one embodiment of the present invention, a method for providing notification of a failed resource managed by a resource manager. A processor receives a request to perform a transaction, wherein one or more activities of the transaction are associated with one or more application server processes. The processor creates an entry in a mapping file, wherein the entry includes at least information regarding the one or more application server processes and the one or more resource managers to which the one or more application server processes are connected, to perform the one or more activities of the transaction. In response to detection of a resource failure associated with a resource manager of the one or more resource managers, the processor receives a notification from a call-back function of an extended architecture (XA) switch of the resource manager associated with the resource failure. The processor determines the one or more application server processes connected to the resource manager associated with the resource failure, from the entry created in the mapping file, and the processor sends an event to terminate the one or more application server processes connected to the resource manager associated with the resource failure.

DETAILED DESCRIPTION

Embodiments of the present invention recognize that errors related to RM failures within distributed transaction multi-process environments are handled by the application program due to direct communication between the resource managed by the RM and the application. Additional propagation of errors by other application server processes accessing the failed resource may occur due to a time delay of notification and roll-back by the application program.

It is expected to be a "good practice" to handle all the errors in the application itself; however, handling of resource related errors may lead to degradation of the application performance. Customers having a large code base may not have access to the source code, or may tolerate this problem, opting not to modify the application, which would require re-compiling and extensive re-testing. Alternatively, the system supporting the transaction manager can receive notification of the errors and handle the errors gracefully. Handling errors gracefully includes termination of the application server processes executing the activities of the transaction at a point in which other activities (tasks) that are being performed within the transaction are not critical. If a critical activity is being performed, the transaction is terminated after the critical activity is completed.

Embodiments of the present invention include a call-back notification received from the RM switch associated with the resource failure, to component functions of the TM, such that in the event of receiving a call-back notification the error handling associated with the resource failure can be expediently handled by the middleware supporting the TM, reducing the burden on the application program and shifting programming responsibility for resource failure error handling to the middleware applications.

Figure 1:
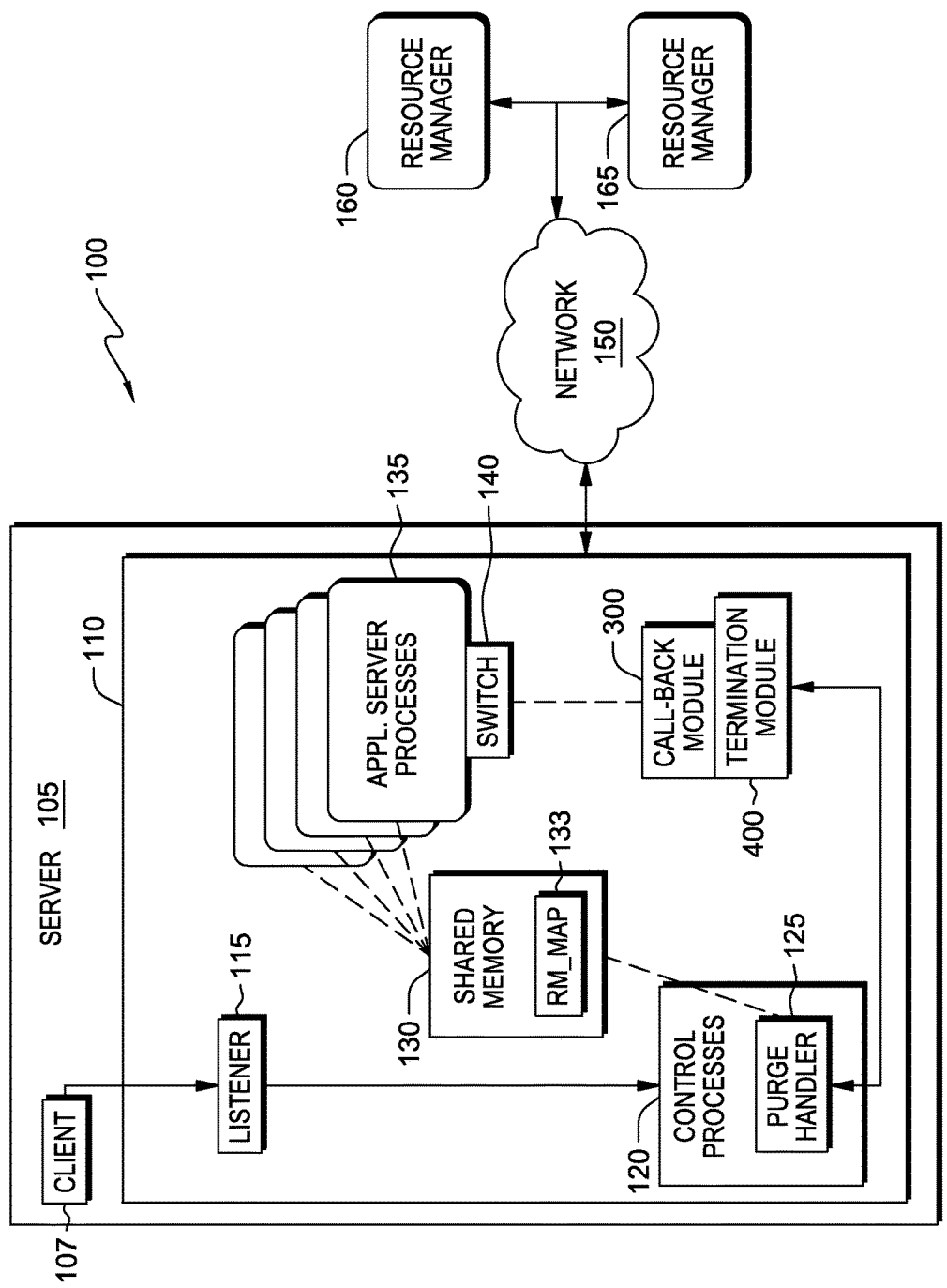
FIG. 1 is a functional block diagram illustrating components of a distributed transaction processing (DTP) environment, in accordance with an embodiment of the present invention.

The present invention will now be described in detail with reference to the Figures. FIG. 1. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating components of a distributed transaction processing (DTP) environment, generally designated 100, in accordance with an embodiment of the present invention. DTP environment 100 includes server 105, client input 107, transaction manager 110 (TM 110), resource manager 160 and resource manager 165, all interconnected through network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between application server processes 135, RMs 160 and 165, call-back module 300, termination module 400, and TM 110, in accordance with embodiments of the present invention.

In some embodiments, server 105 may host the application program for client 107 and host TM 110 and its operational components. In other embodiments, client 107 may connect to server 105 and TM 110 via network 150. Server 105 may be a desk top computing device, a rack mounted computing device, a blade server, a management server, a mobile computing device, or any other electronic device or computing system capable of performing program instructions, and receiving and sending data. In other embodiments, server 105 may represent a computing system utilizing multiple computers as a server system, such as in a cloud computing environment. In yet another embodiment, server 105 may be a laptop computer, a tablet computer, a netbook computer, a personal computer (PC), a desktop computer, a personal digital assistant (PDA), a smart phone, or any programmable electronic device capable of communicating with TM 110, client 107, and RMs 160 and 165, via network 150. In another embodiment, sever 105 can be a computing system utilizing clustered computers and components (e.g., database server computer, application server computers, etc.) that act as a single pool of seamless resources when accessed within distributed transaction processing environment 100. Server 105 may include internal and external hardware components, as depicted and described with reference to FIG. 5.

TM 110 includes listener 115, control processes 120, shared memory 130, application server processes 135, RM switch 140, call-back module 300, and termination module 400. In some embodiments of the present invention, TM 110 is an operational part of a middleware environment residing on server computer 105, receiving workload from client input 107. TM 110 coordinates the activities of the workload by applying an identifier associated with the workload request from client input 107 and informing RMs of the identifier, to which the activities of the workload request will be assigned, such as RMs 160 and 165. TM 110 determines the RMs to which activities of a transaction are assigned, for example, a transaction from the workload received by TM 110, from client input 107. TM 110 uses the XA specification standard to connect and communicate with resource managers used in the multi-process transactions of DTP environment 100.

In some embodiments of the present invention, listener 115 is a component of TM 110 and waits to receive workload input requests, such as workload from client input 107. Client input 107 is depicted as the workload request input from the application program residing on server 105, to TM 110. The request from client input 107 is received by listener 115 of TM 110, and listener 115 passes the requested workload to control processes 120.

Control processes 120 is an operational component of TM 110 and handles the processes associated with TM 110. Transactions associated with workload requests, received by listener 115 and passed to control processes 120, generate application server processes 135, which are assigned by TM 110 to resource managers. TM 110 also updates RM_map 133 to represent the association between application sever processes 135 and resource managers 160 and 165. Control processes 120 includes purge handler 125 which responds to a call-back notification from call-back module 300 upon detection of a failure of a resource as detected by the resource manager managing the failed resource. It is understood by one of ordinary skill in the art, that the failure that occurs is associated with a resource; however, for brevity, failures of resources managed by a resource manager will hereafter be referred to as a/the resource manager failure (RM failure) or a failed resource manager (failed RM).

Purge handler 125 uses information entered into RM_map 133 to determine which processes of application server processes 135 are designated for the failed resource manager. Purge handler 125 also communicates to control processes 120 to avoid sending or assigning processes to the failed resource until error handling is resolved, and sends out events to all the application server processes associated with the failed resource to terminate the transactions that are being handled, which are associated with the failed resource manager transaction. Purge handling 125 proceeds through a list of all application server processes associated with the failed resource, from RM_map 133, until all processes have been notified to terminate transaction activities, gracefully. Purge handler 125 also receives input from failure notification module 400 with regard to termination of transactions, gracefully.

Shared memory 130 is memory accessible to TM 110 and also accessible to all application server processes 135. Shared memory 130 includes information associated with which processes are running on particular resources controlled by a particular resource manager. An RM map, such as RM_map 133, is created within the shared memory by control processes 120 upon receiving a workload request, for example one or more transactions, from client 107 as received and transmitted from listener 115. RM_map 133 includes information regarding which application servers and application server processes, are associated with which resources.

Application server processes 135 support the workload activities associated with transactions requested by the application program from client 107. TM 110 has access to a pool of application servers, from which the client 107 requests, received by control processes 120, generate multiple application server processes 135. Application server processes 135 have access to shared memory 130, and each of application server processes 135 is associated with a transaction ID and a resource managed by a particular RM, such as RM 160. The association of each application server process with an application server, resource manager, and resource is included in RM_map 133 of shared memory 130.

Switch 140 is predefined set of interfaces allowing two directional communication between the RM and the TM, as designated by the open/XA standard specification. Switch 140 is generated by a combination of the TM library and the RM library, containing information and predefined communication instructions, or calls. In embodiments of the present invention, switch 140 includes a call-back instruction, or call, which is used to communicate the detection of a resource fail by the RM to the TM. For example, RM 160 detects a resource failure and initiates a call-back from switch 140 to TM 110 indicating the failure, the error code, if known, and the resource and RM associated with the failure.

Call-back module 300 is a component of TM 110 which in some embodiments of the present invention is included as part of a middleware environment installed on a server, such as server 105. Call-back module 300 invokes a call-back function within switch 140 that is initiated upon the detection of a resource failure by a resource manager associated with switch 140 and sent to the transaction manager associated with the resource manager detecting the failure.

For example, call-back module 300 receives the notification of a failed resource from RM 160 and initiates sending a call-back instruction from switch 140 to TM 110, indicating the resource, and resource manager associated with the failure. The call-back is received by purge handler 125, and using information available in shared memory 130 and RM_map 133, control processes 120 sends out events, which are asynchronous messages. The events notify the application server processes associated with the transaction to terminate the transaction activities, gracefully.

Application server processes 135 are a group of servers connected to DTP environment 100 via network 150. In some embodiments of the present invention, application server processes 135 represent a pool of application servers associated with resources, and are used to assign processes to resources to perform activities associated with a transaction requested by the application program of client 107. Resources associated with application server processes 135 may include databases, messaging services, or other resources that perform transactional activity.

RMs 160 and 165 are resource managers that register with transaction managers, such as TM 110, and application programs make connections with resources using application server processes 135 to perform transaction activities on resources. RM 160 and RM 165 manage resources such as databases and messaging services. In embodiments of the present invention, RM 160 and RM 165 are compliant with XA standard specification for distributed transaction processing environments.

Termination module 400 is a component of TM 110, which in some embodiments of the present invention is included as part of a middleware environment installed on a server, such as server 105. Termination module 400 receives the notification of a resource failure through switch 140 associated with an RM, and determines if the application server is engaged in other critical activity, for example, application program updating of a shared data structure. Determining that a critical activity is currently being performed, termination module 400 delays the termination and allows the critical application server process to complete, before terminating the transaction, as a result of the call-back notice to TM 110. This is what is meant by terminating a transaction gracefully. There are many critical sections within the transaction manager code, which corresponds to a point where cancellation should not be allowed, and it is these critical sections that are to be allowed to complete before terminating the application server processes of the transaction associated with the failed resource.

Figure 2:
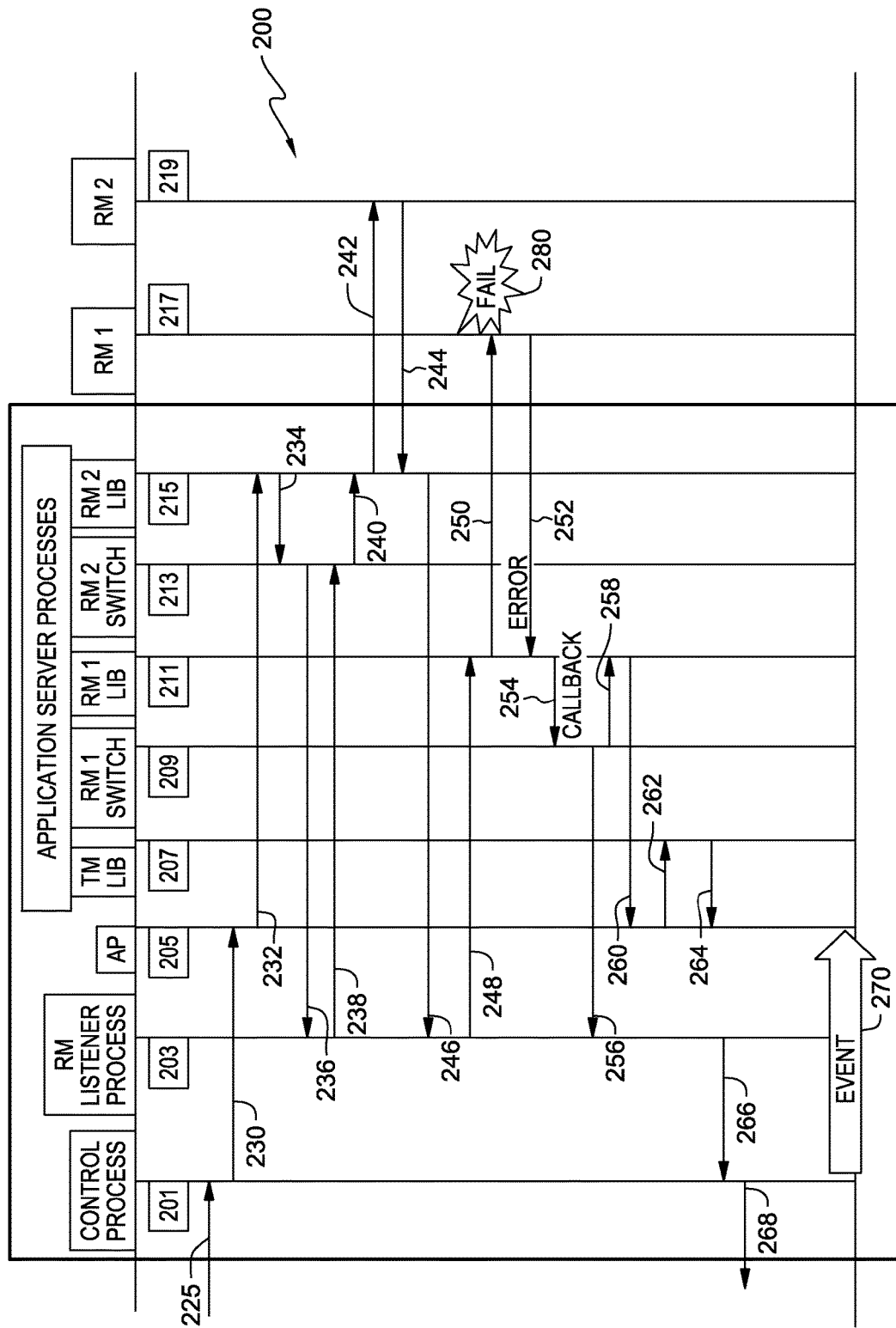
FIG. 2 is a flow diagram depicting instructions of a transaction within the distributed transaction processing environment, in accordance with an embodiment of the present invention.

FIG. 2 is a flow diagram depicting instructions of activities of a transaction within distributed transaction processing environment 200, in accordance with an embodiment of the present invention. For brevity, the illustrated transaction flow omits initial registration connections and represents a portion of communication that occurs between entities supporting the processing of a transaction of a requested workload, in accordance with some embodiments of the current invention.

Control process 201 receives workload request 225 from a user application. Control processes 201 determines a resource to perform an activity of the workload request transaction, and by connection 230 forwards the requested workload to application program 205, generating or selecting from one or more processes of application server processes 135 (FIG. 1). Application program 205 makes connection 232 with RM2 library 215 to obtain information regarding the resource manager RM2, and the resources managed that may perform the activity of the transaction. RM2 library 215 registers connection and transaction status 234 through RM2 switch 213, and RM2 switch 213 responds by propagating registration request 236 to RM listener process 203, to register the resources of RM2 for the transaction. RM listener process 203 responds to the registration request 238 through RM2 switch 213, followed by connection 240 from RM2 switch 213 to RM2 library 215, confirming the resource to perform an activity of the transaction. RM2 library 215 makes connection 242 with resource manager (RM2) 219, and resource manager 219 responds making connection 244 to RM2 library 215, confirming a commit by the resource to complete the activity of the application server process of the transaction. RM2 library 215 propagates the commit activity 246 to RM listener process 203, which stores information associated with the resource committing to perform the process, information associated with the application server process, and information associated with the transaction.

RM listener process 203 makes connection 248 with RM1 library 211, which corresponds to a resource manager for an additional resource to perform a separate activity associated with the requested workload transaction. RM1 library 211 propagates the activity 250 to RM1 217, which is a resource manager of resources separate from those managed by RM2. In making a connection between RM1 library 211 and RM1 217, failure event 280 occurs. RM1 sends an error message to RM1 library by connection 252, which initiates a call-back function that is sent to RM1 switch 209 through call back function 254. Embodiments of the present invention include the call-back function as an activity communicating the resource failure and error message to the transaction manager, such that the transaction manager can take action on the failure on behalf of the application program.

RM1 switch 209 responds by propagating the error 256 to the RM listener process 203, and propagating the error 258 to RM1 library 211, so that other application sever processes associated with the transaction that included the resource failure, can be notified and terminated, gracefully. RM1 switch 209 returns the control to RM1 library 211. RM1 library 211 responds by propagating the error 260 with the application program 205. Application program 205 makes connection 262 with TM library 207, and TM library 207 makes connection 264 with application program 205 to terminate transaction activity and initiate a roll back of completed transaction activity. RM listener process 203 makes connection 266 with control processes to execute the termination (gracefully) and roll back completed activities of the transaction. Control process 201 makes connection 268 with the client of workload request 225, and event 270 is sent to terminate the in-progress activity for each application sever process on which the transaction depending on the RM is running. Event 270 includes an event to refresh the connection for each application sever process which has a connection to the failed RM1 217.

In the above activity flow scenario, RM1 217, having detected a failure of a resource, connected with RM1 switch 209 and initiated a call-back that is received by TM library 207. This enables the transaction manager, which in some embodiments is included within a middleware environment, to receive notification of the failure and perform termination and roll back of transaction activity, and error handling, on behalf of the application program. Absent the call-back function, the transaction manager (TM library 207) receives no communication from RM1 regarding the failure, and the burden of activity termination and error handling falls to the application program.

Figure 3:
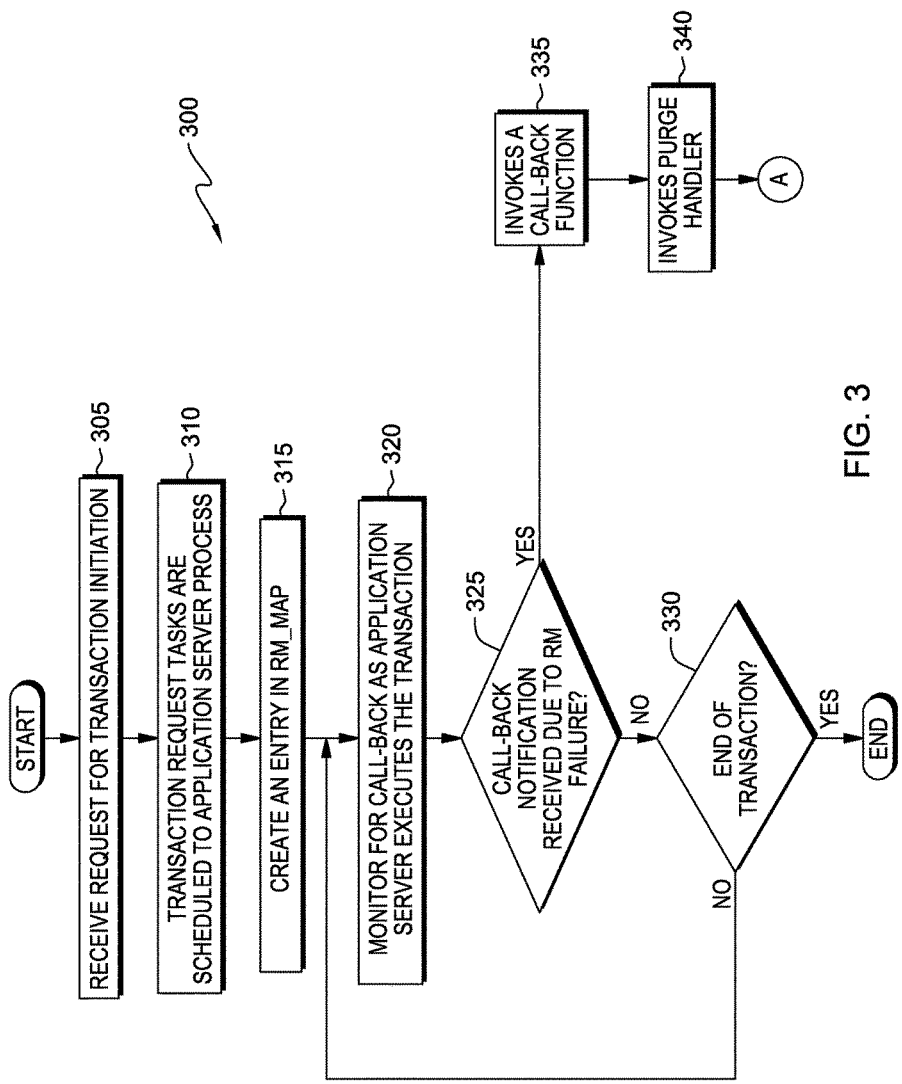
FIG. 3 is a flowchart depicting operational steps of a call-back module, operating on a server computer within the data transaction processing environment of FIG. 1, in accordance with an embodiment of the present invention.

FIG. 3 is a flowchart depicting operational steps of call-back module 300, operating on server computer 105 within data transaction processing environment 100 of FIG. 1, in accordance with an embodiment of the present invention. Call-back module 300 and termination module 400 operate within transaction manager 110 as part of a middleware application environment hosted on server computer 105. The flowchart of FIG. 3 assumes the basic registration of resource managers using XA DTP/Open Transaction protocol with the transaction manager coordinating the connection and scheduling of transaction activities with resources managed by resource managers. Additionally, a call-back notification connection, associated with the switch between the transaction manager and each resource manager, is assumed to be registered with the respective resource manager. Call-back module 300 receives a request to initiate a transaction from a client application (step 305).

The transaction request activities are scheduled to application server processes (step 310). Call-back module 300 passes the transaction request to control processes 120 (FIG. 1), which schedules the transaction request from the pool of application servers to application server processes 135, available to TM 110. Call-back module 300 creates an entry in the resource manager map (RM_map 133) (step 315). The application server process loads the application program corresponding to its activity of the transaction request. In some embodiments of the present invention, each application server process creates an entry in RM_Map 133 which includes information associated with the application server process, and the resource manager scheduled to perform the transaction activity, based on instructions from call-back module 300. In other embodiments, call-back module 300 program instructions are integrated within the code components of TM 110, depicted in FIG. 1. RM_Map 133 is part of shared memory 130, accessible by all application server processes.

Call-back module 300 monitors for call-back as the application server executes the transaction (step 320). Call-back module 300 uses switch 140 to determine if a call-back notification is received from a resource manager indicating a failure, while the application server continues to execute the transaction. Application server processes interact directly with resource managers, and the application program performs work via the resource managers through the RM specific interfaces. Processing continues until the work associated with each activity of the transaction is completed. For example, application server processes 135 connected directly to RM 160 continue to perform activities associated with the requested transaction until all activities are complete or a call-back notification is determined.

While transaction activities are performed, call-back module 300 determines if a call-back notification is received due to an RM failure occurring (decision step 325). If an RM failure has occurred (step 325, "YES" branch), the library of the failed RM detects the failure or unavailability of the resource associated with the resource manager. In embodiments of the present invention, the calls of the RM library are included within the XA switch between the RM and TM, and when the failure notification, for example, an error notification, is received by the RM library, the received error notification of the RM failure triggers a call-back function, and call-back module 300 detects the RM failure. For example, RM 160 (FIG. 1) is performing workload activities via application program business logic, using one of application server processes 135. RM 160 fails or is unavailable to perform an activity, and an error notification is received by the library of RM 160. Call-back module 300 includes a call-back function, registered with RM 160, within switch 140, which is a combination of the library of RM 160 and the library of TM 110.

Having determined that an RM failure occurred, based on the receipt of the error notification by the RM library, call-back module 300 invokes a call-back function (step 335). The call-back function is registered with the resource manager, and is invoked by the receipt of an error notification of the resource manager. The invoked call-back function connects to the controller processes of the transaction manager by way of the switch between the TM and RM. For example, an error notification is received by the library of RM 160. Call-back module 300 invokes a call-back function, which is registered with RM 160. The call-back function is invoked within the failed application server process and the call-back function uses switch 140 to connect to control processes 120 of TM 110.

Having invoked the call-back function, due to the receipt of the error notification and using the failed application server process to connect with the control processes of the transaction manager, call-back module 300 invokes a purge handler (step 340). The call-back function further informs the controller processes of the RM failure by sending an event that invokes the purge handler functionality. The purge handler enables the middleware application environment, in which the transaction manager operates, to handle the termination of transaction activities associated with the failed resource manager, on behalf of the application program. For example, having received a call-back notification from switch 140, control processes 120 of TM 110, invokes purge handler 125.

Having invoked the purge handler, call-back module 300 turns control over to termination module 400 (A). The description of the operational steps of failure notification module 400 continues with the discussion of FIG. 4.

For the case in which it is determined that a RM failure has not occurred (step 325, "NO" branch), call-back module determines if all transactions have completed (decision step 330). Call-back module 300 determines the status of all transaction activities by accessing the shared memory of the transaction manager. If all transaction activities are not complete (step 330, "NO" branch), call-back module 300 proceeds to monitor for a call-back notification, as transaction activities continue to be processed (step 320), and continues as described above. In the case in which call-back module 300 determines that all activities have been completed, reaching the end of the transaction (step 335, "YES" branch), call-back module 300 ends.

Figure 4:
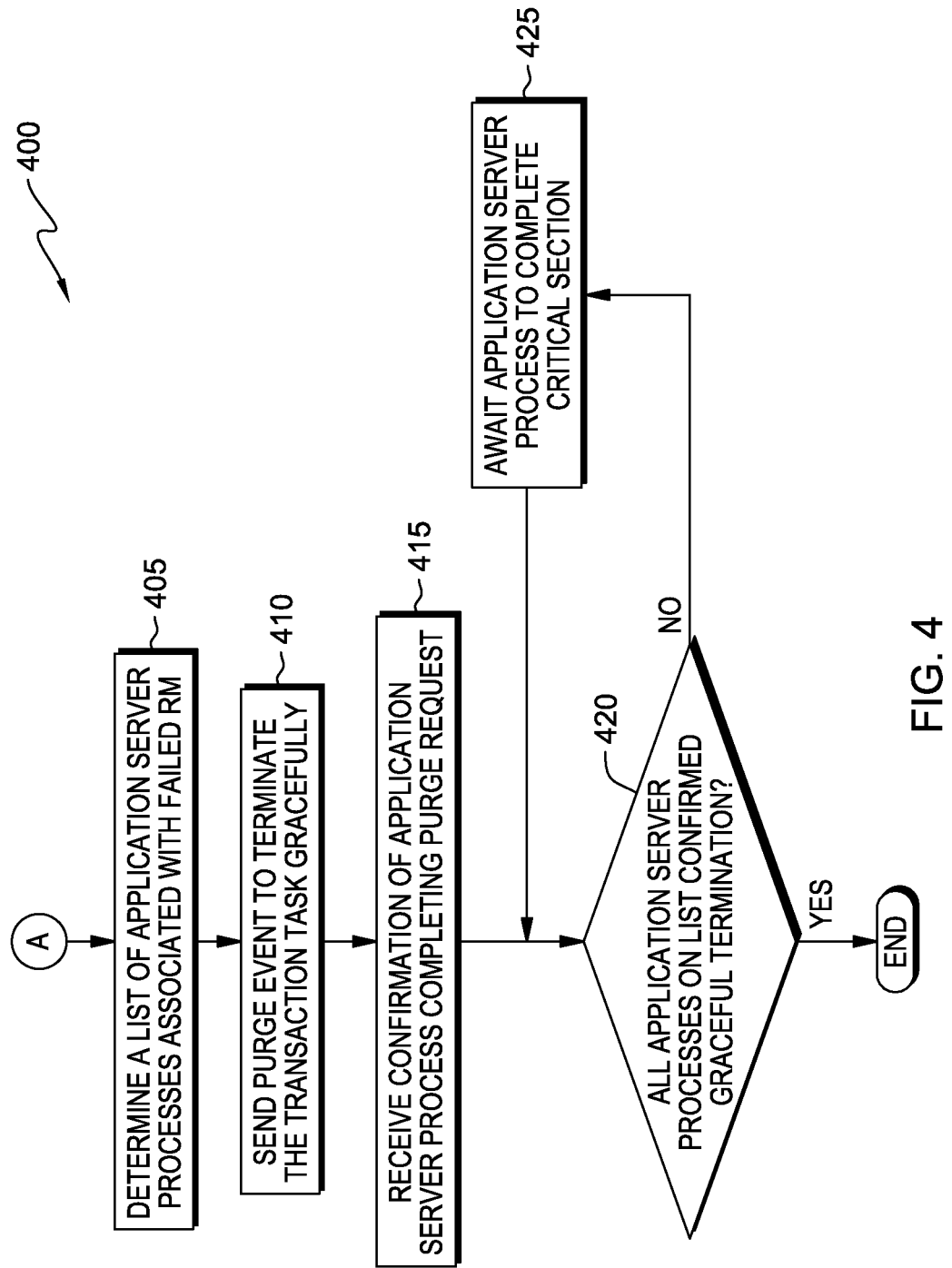
FIG. 4 is a flowchart depicting operational steps of a termination module, operating on a server computer within the data transaction processing environment of FIG. 1, in accordance with an embodiment of the present invention.

FIG. 4 is a flowchart depicting operational steps of failure notification program 400, operating on server computer 105 within data transaction processing environment 100 of FIG. 1, in accordance with an embodiment of the present invention. Termination module 400 receives control from call-back module 300 after a purge handler has been invoked by the control processes of the transaction manager. Termination module 400 determines the identity of application server processes associated with the failed RM (step 405). The purge handler identifies all the application server processes associated with the failed RM by reading the information in the RM_Map of the shared memory. The RM_Map includes information of which application server processes are associated with which resource managers for a given transaction. Based on the information, the purge handler determines all the application server processes that are affected by the RM failure.

For example, subsequent to a failure of RM 160 and invoking of purge handler 125, termination module 400 directs purge handler 125 to access RM_Map 133 of shared memory 130 and to read the information associated with the application server processes. Purge handler 125 determines the application server processes that are associated with failed RM 160.

Having determined the application server processes associated with the failed RM, termination module 400 sends a purge event to terminate the transactions, gracefully (step 410). Termination module 400 generates events, which are asynchronous messages that are sent to the application server processes, to terminate the transaction gracefully. The RM failure is detected in one application server process, and the events inform the other application server processes, which are associated with failed RM, to terminate transaction activities gracefully, and avoid propagating errors. In one embodiment of the present invention, events are sent sequentially to each application server process. In another embodiment, multiple application server processes are sent events to terminate transaction activities, simultaneously.

Gracefully terminating transaction activities performed by the application program running within the application server processes, refers to the consideration of critical sections of the transaction in which the process or transaction should not be interrupted. This may be to insure data integrity of a database update, or a message confirming completion of a critical activity, for example. Gracefully terminating the transaction processes includes allowing completion of critical section activities before termination of the processes and the transaction. Events instructing termination of processes or transactions during non-critical sections are carried out without delay.

In response to the graceful termination of transaction activities, termination module 400 receives confirmation of the application server processes completing the purge request (step 415). As application server processes respond to the event to terminate, confirmation is sent and received by termination module 400, to determine which processes are terminated and which still require termination.

Termination module 400 determines if all application server processes on the list have confirmed graceful termination (decision step 420). Termination module 400 iterates through the list of application server processes that are associated with the failed RM, determining if the process termination has been confirmed. In the case in which the termination of all the application server processes have not been confirmed, (step 420, "NO" branch), termination module 400 awaits the application sever processes to complete the critical section processing (step 425) and returns to determine if application server processes on the list of RM_map 133 have confirmed graceful termination (step 420), and continues as described above.

In the case in which all application sever processes on the list are confirmed graceful terminated (step 420, "YES" branch), termination module 400 ends.

Figure 5:
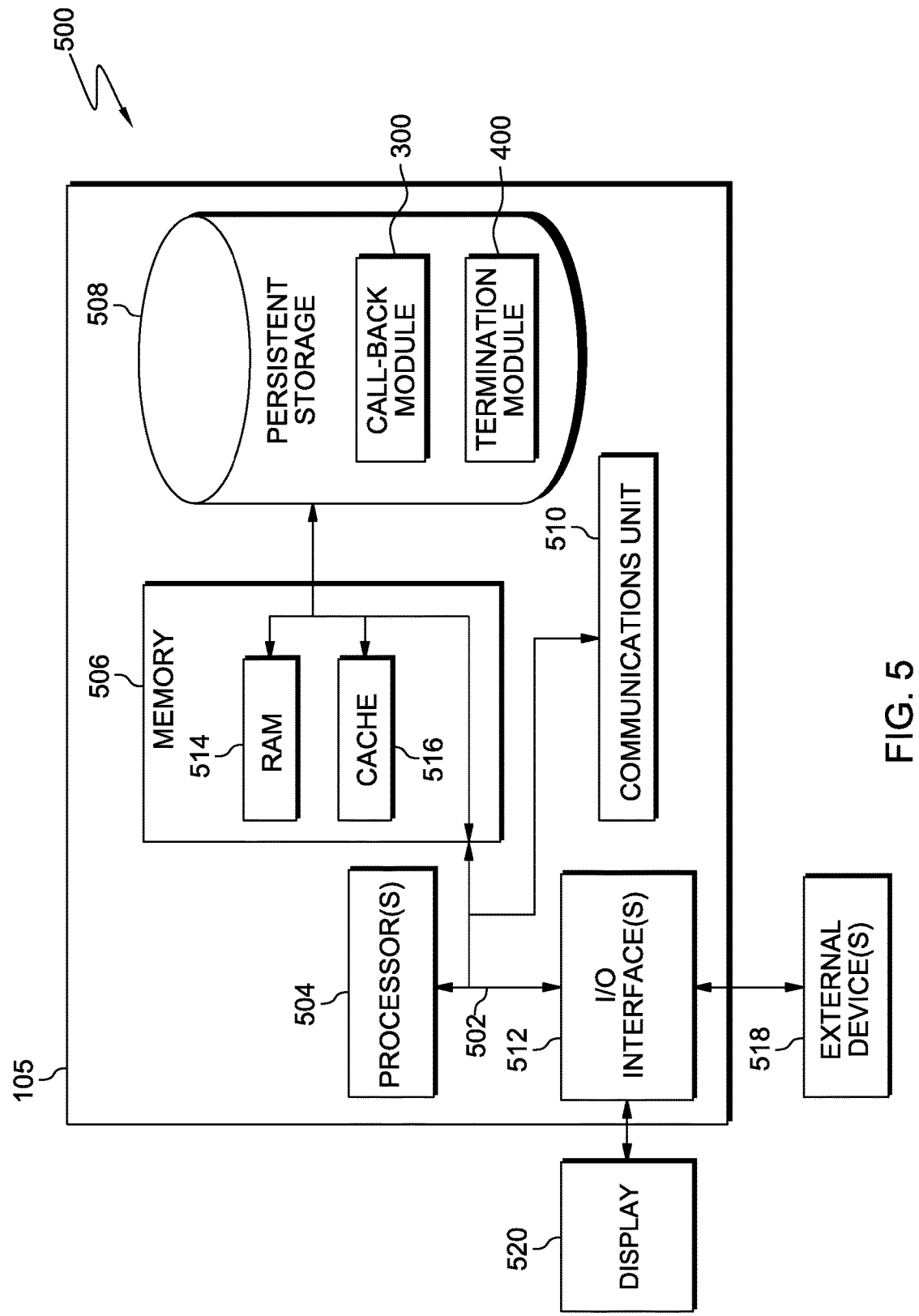
FIG. 5 depicts a block diagram of components of a sever computer operating within the distributed transaction processing environment of FIG. 1, and capable of executing a call-back module and a termination module, in accordance with an embodiment of the present invention.

FIG. 5 depicts a block diagram of components of computing system 500, including server computer 105, operating within distributed transaction processing environment 100, and capable of executing call-back module 300 and termination module 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server computer 105 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Call-back module 300 and termination module 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed transaction processing environment 100. In these examples, communications unit 510 includes one or more network interface cards. Communications unit 510 may provide communications through the use of either or both physical and wireless communications links. Call-back module 300 and termination module 400 may be downloaded to persistent storage 508 through communications unit 510.

I/O interface(s) 512 allows for input and output of data with other devices that may be connected to server computer 105. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., call-back module 300 and termination module 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing notification of a failure of a resource managed by a resource manager, the method comprising:
   a processor receiving a request to perform a transaction, wherein one or more activities of the transaction are associated with one or more application server processes;
   the processor creating one or more entries in a mapping file, wherein the one or more entries include at least information regarding the one or more application server processes and the one or more resource managers to which the one or more application server processes are connected, to perform the one or more activities of the transaction;
   in response to detection of a resource failure associated with a resource manager of the one or more resource managers, the processor receiving a notification from a call-back function of an extended architecture (XA) switch of the resource manager associated with the resource failure;
   the processor determining the one or more application server processes connected to the resource manager associated with the resource failure, from the one or more entries included in the mapping file; and
   the processor sending an event to terminate the one or more application server processes connected to the resource manager associated with the resource failure.

2. The method of claim 1, wherein the one or more application server processes are included in a multi-process transaction environment.

3. The method of claim 1, wherein the call-back function is registered as part of the extended architecture (XA) switch for each resource manager of the one or more resource managers.

4. The method of claim 1, further comprising:
   sending, by the processor, events to terminate in-progress application server processes associated with the transaction and associated with the resource failure, based on initiation of control processes from the notification of the call-back function.

5. The method of claim 1, wherein receiving a notification from the call-back function of the extended architecture (XA) switch of the resource manager associated with the failure, triggers control processes to send the event to terminate the application server process associated with the failure of the resource manager.

6. The method of claim 1, wherein sending the event includes terminating all in-progress transactions utilizing the resource that has failed.

7. The method of claim 1, wherein sending the event to terminate the one or more application server processes, includes gracefully terminating the one or more server processes, and wherein gracefully terminating includes allowing execution of an in-progress critical section of a transaction to complete, prior to termination of the application server processes.

* * * * *